Aug. 13, 1968  H. W. HOSFORD  3,397,302
FLEXIBLE SHEET-LIKE ELECTRIC HEATER
Filed Dec. 6, 1965

INVENTOR
HARRY W. HOSFORD

BY *Oberlin, Maky & Donnelly*
ATTORNEYS

United States Patent Office 3,397,302
Patented Aug. 13, 1968

3,397,302
FLEXIBLE SHEET-LIKE ELECTRIC HEATER
Harry W. Hosford, 2741 Ashley Road,
Shaker Heights, Ohio 44122
Filed Dec. 6, 1965, Ser. No. 511,680
2 Claims. (Cl. 219—528)

ABSTRACT OF THE DISCLOSURE

Thin flexible sheet-like electric heating means for aircraft wings, comprising two thin sheets of electrically conductive metal foil substantially equal in area to and disposed on either side of and in direct contact with a thin electric resistance layer of polytetrafluoroethylene impregnated with carbon particles. A thin outer envelope of polytetrafluoroethylene closely encloses the foregoing assemblage. Current conducting lead wires extend along substantially the entire length of said heating means and respectively connect with said two metal foils.

---

The present invention relates as indicated to flexible heating means, and more particularly to a flexible heater for deicing or preventing ice accumulation on surfaces of aircraft and the like.

Present commercially available equipment for deicing aircraft surfaces such as the leading edges of the wings or tail sections of the aircraft are less than satisfactory for a number of reasons. Initially, all of the systems which applicant is familiar with are relatively expensive to install, a very important consideration for the owners and operators of relatively small aircraft. Secondly, present systems are relatively bulky and add considerable weight to the aircraft, which is undesirable from an operational standpoint. Further, present systems are not always dependable. A common such system comprises the provision of inflatable rubber boots mounted at the leading wing edges and being operatively connected to a pressurized system for periodically inflating and deflating the same. In theory, the ice accumulating on the rubber boot can be broken away therefrom by the sudden shock attending the inflation of the boot, with the boot being thereafter deflated preparatory to a subsequent cycle. In practice, it is not always possible to remove all the ice, and the operation of the boot system requires rather careful timing. Further, boot operation affects the airfoil characteristics of the wing and as a result the boots cannot be operater during landing or taking off of the aircraft. The boots are prone to rotting due to sun exposure and must be replaced at significant expense every few years.

Although electrical heating systems have been previously employed, such systems have been objectionable due to the cost factors above discussed, in addition to the inability to provide uniform heat, with the result that a relatively large power source is required in present electrical systems.

With the above in mind, a primary object of the present invention is to provide a flexible heating means which can be electrically energized for deicing the leading wing edges or other surfaces subjected to ice build-up. Alternatively, the flexible heating means of the invention is adapted to entirely prevent ice accumulation on the wing edges or such other surfaces of the aircraft subjected to such accumulation.

A further object of the present invention is to provide such a flexible heating means which can be mounted on any particular surface without regard to the contour thereof. In accordance with the present invention, the heater means is highly flexible and can be bonded or mechanically mounted to the selected surfaces of the aircraft as desired.

A further object of the present invention is to provide an electrically energized flexible heater means which can be operated from the electrical system of the airplane, without necessitating the purchase and operation of additional generating equipment.

A further object of the present invention is to provide a flexible heating means which is extremely light so as not to significantly affect the weight of the aircraft, and which is mounted so as not to adversely affect the airfoil of the wing.

A further object of the present invention is to provide an electrically energized heating means of the type described which requires a relatively small amount of electrical power for realizing the intended result.

These and other objects and advantages of the present invention will become apparent as the following description proceeds.

To the accomplishment of the foregoing and related ends, the invention, then, comprises the features hereinafter fully described and particularly pointed out in the claims, the following description and the annexed drawing setting forth in detail certain illustrative embodiments of the invention, these being indicative, however, of but a few of the various ways in which the principle of the invention may be employed.

Figure 1:
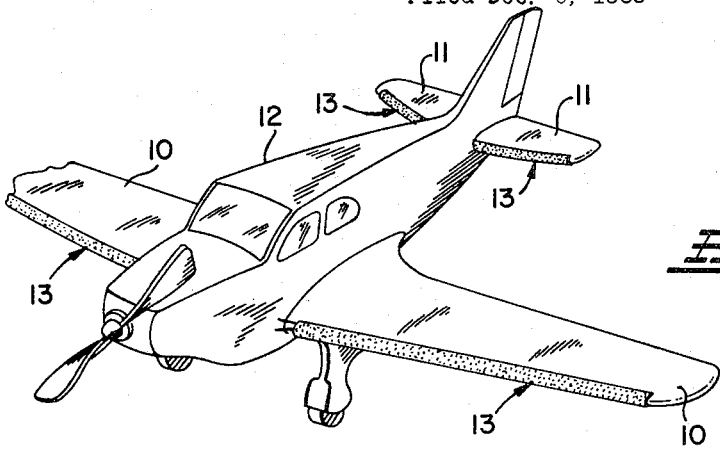
FIG. 1 shows the flexible heating means of the present invention operatively mounted on the leading edge of an aircraft wing.
Figure 2:
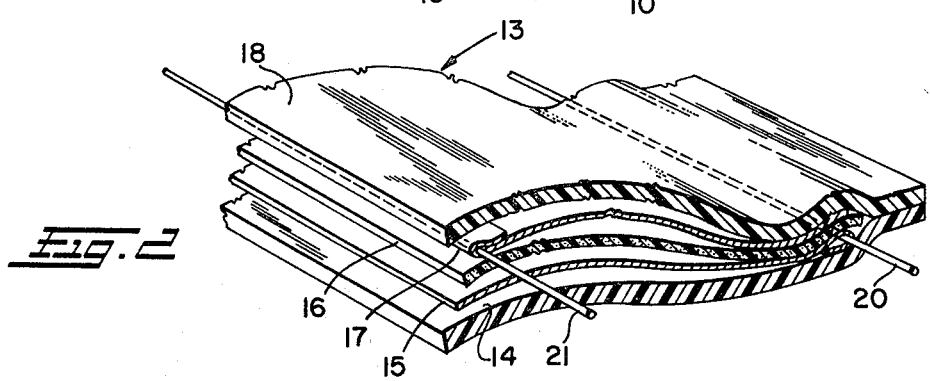
FIG. 2 is a fragmentary perspective view of the heating means per se, with the various layers which comprise the heating means being partially separated.
Figure 3:
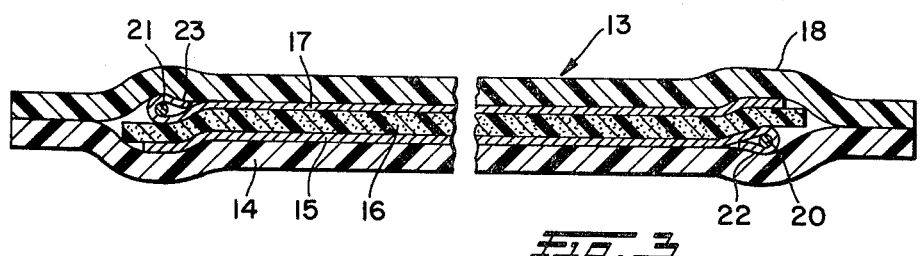
FIG. 3 is an enlarged, transverse sectional view through the heating means.

Referring now in more detail to the drawings, wherein like parts are indicated by like reference numerals, and initially to the form of the invention shown in FIGS. 1-3 the leading edges of the wings 10 and tail sections 11 of an aircraft 12 have mounted thereon the flexible heating means of the present invention, generally indicated at 13 with a separate heater being applied to each such wing and tail section. The aircraft per se forms no part of the present invention, and the aircraft shown is intended merely to exemplify one type of aircraft or the like with which the present invention can be employed.

Referring to FIGS. 2 and 3, each heater 13 is of laminated construction and comprises a bottom layer 14 of an electrical insulating material preferably comprising a synthetic resin, with polytetrafluoroethylene of approximately .005″ to .010″ thickness being preferred. Although polytetrafluoroethylene is preferred owing to the desirable characteristics thereof, for example resistance to heat a the operating temperatures of the system, other insulating materials having similar characteristics could also be employed, e.g., polychlorotrifluoroethylene. Overlying the layer 14 is a layer 15 of electrically conductive metalli foil material, with aluminum of approximately .002″ t .003″ thickness being preferred. Intermediate layer 1 preferably is approximately .005″ in thickness and i formed of a normally insulating material impregnate with electrically conductive particles, with polytetra fluoroethylene impregnated with finely divided carbo particles being the preferred material. The resistance o the layer 16 is preferably in the range of 1–20 ohms, wit 2–4 ohms being most preferred for the 24-volt electrica system normally available for energizing the heaters 1:

The remaining layers of the heater comprise an uppe layer 17 of similar material and thickness to layer 1!

preferably aluminum foil, and a top layer 18 preferably of polytetrafluoroethylene and comparable in thickness to the bottom layer 14. The several described layers are preferably united by pressing under heat to form a unitary laminated construction, with the overlapped edges of the top and bottom layers 18 and 14, respectively, being fused to envelop and seal the layers therebetween, as clearly shown in FIG. 3.

The intermediate layer 16 comprises the electrical resistance element for the heater, and is energized by current-conductive wires 20 and 21. The layer 15 of aluminum foil is in the form shown turned at one side thereof as indicated at 22 to provide an area or pocket for receiving wire 20. When the several layers are fused as described, the wire 20 is effectively confined within such area. The upper layer 17 of aluminum foil is similarly inwardly turned in the form shown as indicated at 23 to receive wire 21. It will be understood that the wires 20 and 21 could alternatively be laid flat against layers 15 and 16, with the important consideration being good electrical contact therebetween.

The wires 20 and 21 preferably extend the entire length of the heater 13 and are stripped of insulation along such area to enhance the electrical contact with the conductive layers 15 and 17. Where the wires 20 and 21 leave the heater for suitable connection to the aircraft generating system, the insulated wires are preferably bonded, by heat sealing or the like, to and/or between the insulating layers 14 and 18, respectively. By locating the respective lead wires 20 and 21 as shown in FIG. 2, each extending along and contacting a marginal portion of a respective foil sheet laterally spaced from the other, a more uniform flow of current is produced through the resistance layer 16 with consequent uniform heating effect.

The laminated heater 13 is highly flexible and is readily conformable to the contour of the leading edge of the aircraft wing or tail sections, or any other contoured surface to which it is desired to be applied. The heaters 13 can be mounted in any suitable manner, with the preferred method of mounting being by means of a commercially available pressure-sensitive adhesive which can be applied to the entire surface of the bottom insulating layer 14 immediately before use, or, alternatively, be preapplied and covered with a backing sheet which may be removed just before use to expose the adhesive coating. This preferred method of mounting the heater is relatively inexpensive and affords realization of the desired advantage of adapting the heater for use with variable contour surfaces. The heaters could also be mounted by heat fusing the same to the wing surfaces, or by means of an epoxy cement, or by purely mechanical means such as clamping or the like.

To install the heater system, the heaters 13 are bonded to the wing and tail edges as described, and the wires 20 and 21 are connected to the electrical system of the airplane. For convenient operation of the deicing system, suitable control switching can be mounted on the control panel of the aircraft and, if desired, a thermostat could be installed in the wing or wings to effect automatic operation of the units. To prevent ice accumulation or to eliminate ice built up on the heaters 13, the units are energized, either manually or automatically, and current is passed uniformly through the carbon-impregnated layers 16 which act as resistance elements. In the form shown, the foil layers 15 and 17 are connected in series, with the current entering one of such layers and passing uniformly through the resistance element 16 by virtue of the continuous contact surface therebetween, and subsequently passing through the other of such foil layers back to the current source.

There is a resulting uniform heat build-up across the resistance element 16, which heat is uniformly dissipated outwardly through the conductive layer 17 to the outer layer 18 to provide a uniform heat pattern across the surface of the latter. The heat conductively passed to the outer layer 18 tends to melt any ice which has built up on the layers or to prevent any ice from forming on such layer. In the normal operation of the device the temperature in the outer layer 18 of the heaters 13 may safely reach 275° F., but more normally is in the range of 100° F., to provide prompt melting of any ice formed on the aircraft wings.

The employment of the laminated heater with the layers arranged in the indicated manner is advantageous for a number of reasons. Initially, the preferred polytetrafluoroethylene material comprising outer layer 18 inherently resists ice build-up. Specifically, the nature of the surface of the material tends to deflect moisture striking such surface, rather than inducing accumulation thereof. Secondly, the uniform heat pattern created in the layer 18 eliminates the formation of hot and cold spots therein thereby permitting deicing with relatively small power requirements. Further, the heater 13 of the present invention is relatively thin, being approximately .025 inch thick, and, by virtue of the materials employed, highly flexible thereby readily to adapt the same to various contour surfaces. Each heater can be readily applied through the indicated bonding means to the leading wing or tail edge, and the heaters can be energized by means of existing generating equipment.

Figure 4:
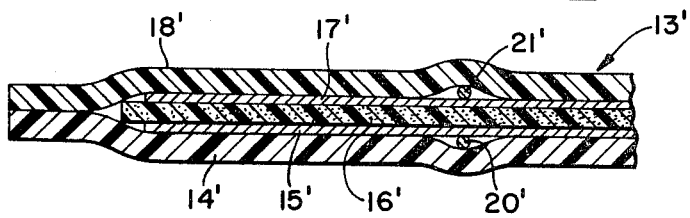
FIG. 4 is a partially fragmentary, sectional view similar to FIG. 3 through a modified form of heating means constructed in accordance with the present invention.

Referring to the form of the invention illustrated in FIG. 4, wherein previously described components have been given the same reference numeral with an attached prime, the lead wires 20' and 21' in this form are mounted generally centrally of the width of the preferably foil layers 15' and 17' and suitably secured thereto in good electrical connection therewith. The trailing edges of the heater, comprising the fused or otherwise joined bottom and top layers 14' and 18', respectively, may be clamped to the leading edges of the wing or tail by elongated clamp means to permit removal thereof when weather conditions do not require their use. The heaters may of course be bonded to the wing or tail edges as above described.

By mounting the wires 20' and 21' generally centrally of the width of the conductive layers 15' and 17', the current is more directly transferred between such layers and through the resistance layer 16' with the result that relatively thinner foil layers 15' and 17' may be employed to enhance heat transfer to the outer layers 14' and 18'. This is particularly desirable in relatively larger aircraft where heat requirements are correspondingly greater. The central disposition of the wires 20' and 21' also affords somewhat improved airfoil characteristics, with the wires when the heaters are installed being approximately at the tips of the wing or tail edges.

It will be apparent that the flexible heating means of the present invention could additionally be mounted on plane surfaces other than those described and illustrated, for example on the front edge of the vertically extending tail section. It will further be apparent that the flexible heating means of the present invention is adaptable for use in other environments than that shown and described. To mention but one additional use, the laminated construction may be employed with clothing in arctic or similar conditions, with the low power requirements permitting operation with a self-contained or portable power source.

Other modes of applying the principle of the invention may be employed, change being made as regards the details described, provided the features stated in any of the following claims or the equivalent of such be employed.

I therefore particularly point out and distinctly claim as my invention:

1. A thin flexible sheet-like electric heating means comprising two thin sheets of electrically conductive metal foil substantially equal in area to and disposed on either side of and in direct contact with a thin electric resistance layer of polytetrafluoroethylene impregnated with carbon particles, a thin outer envelope of polytetrafluoroethylene closely enclosing the foregoing assemblage in direct contact with the entire surface of said foil sheets and directly bonded to marginal portions of said resistance layer, a lead wire extending along substantially the entire length of said heating means and contacting only one substantial longitudinal edge portion of one of said foil sheets, and another lead wire extending along substantially the entire length of said heating means and contacting only a substantial longitudinal edge portion of said other foil sheet remote from said first-mentioned wire, whereby current may pass from one lead wire uniformly to the edge portion of said first sheet contacted thereby, pass through said first foil sheet, said thin electric resistance layer, and said second foil, and thence uniformly to said other lead wire, said edge portions of said foil sheets being folded closely to enclose therein said respective lead wires.

2. The electric heating means of claim 1 wherein said electric heating means has a composite thickness of .025 inch and is readily flexible to conform to varying contour surfaces.

References Cited
UNITED STATES PATENTS

| | | | |
|---|---|---|---|
| 2,255,376 | 9/1941 | Bull et al. | 219—52 |
| 2,274,839 | 3/1942 | Marick | 219—549 |
| 2,340,097 | 1/1944 | Woodman | 219—549 |
| 2,473,183 | 6/1949 | Watson | 219—54 |
| 2,559,077 | 7/1951 | Johnson et al. | 219—54 |
| 3,221,145 | 11/1965 | Hager | 219—54 |
| 3,268,846 | 8/1966 | Morey | 338—21 |
| 3,277,419 | 10/1966 | Butz | 338—31 |
| 3,281,579 | 10/1966 | Glicksman | 219—53 |
| 3,287,684 | 11/1966 | Armbruster | 338—21 |
| 3,311,862 | 3/1967 | Rees | 338—21 |

ANTHONY BARTIS, *Primary Examiner.*

V. Y. MAYEWSKY, *Assistant Examiner.*